(12) United States Patent
Knox et al.

(10) Patent No.: US 8,400,093 B2
(45) Date of Patent: Mar. 19, 2013

(54) DEVICE, COMPUTER PROGRAM PRODUCT AND COMPUTER-IMPLEMENTED METHOD FOR BACKSPIN DETECTION IN AN ELECTRICAL SUBMERSIBLE PUMP ASSEMBLY

(75) Inventors: Dick L. Knox, Claremore, OK (US); Robert H. McCoy, Talala, OK (US); Jerald R. Rider, Tulsa, OK (US)

(73) Assignee: Baker Hughes Incorporated, Houston, TX (US)

( * ) Notice: Subject to any disclaimer, the term of this patent is extended or adjusted under 35 U.S.C. 154(b) by 200 days.

(21) Appl. No.: 12/869,368

(22) Filed: Aug. 26, 2010

(65) Prior Publication Data

US 2011/0050144 A1 Mar. 3, 2011

Related U.S. Application Data

(60) Provisional application No. 61/237,405, filed on Aug. 27, 2009, provisional application No. 61/237,415, filed on Aug. 27, 2009.

(51) Int. Cl.
*H02H 7/097* (2006.01)

(52) U.S. Cl. ........ 318/490; 318/255; 318/256; 318/257; 318/258; 318/259

(58) Field of Classification Search .......... 318/490, 318/255–265
See application file for complete search history.

(56) References Cited

U.S. PATENT DOCUMENTS

| | | | | |
|---|---|---|---|---|
| 4,410,845 A | * | 10/1983 | Lockyear | 318/459 |
| 5,193,985 A | * | 3/1993 | Escue et al. | 417/53 |
| 5,198,734 A | * | 3/1993 | Johnson | 318/369 |
| 6,041,856 A | * | 3/2000 | Thrasher et al. | 166/53 |
| 6,587,037 B1 | | 7/2003 | Besser | |
| 6,798,338 B1 | | 9/2004 | Layton | |
| 7,330,779 B2 | * | 2/2008 | Schulz | 700/282 |

OTHER PUBLICATIONS

Co-pending U.S. Appl. No. 12/869,443, filed Aug. 26, 2010, titled Device, Computer Program Product and Computer-Implemented Method for Backspin Detection in an Electrical Submersible Pump Assembly.
Co-pending U.S. Appl. No. 12/869,409, filed Aug. 26, 2010, titled Device, Computer Program Product and Computer-Implemented Method for Backspin Detection in an Electrical Submersible Pump Assembly.

* cited by examiner

*Primary Examiner* — Walter Benson
*Assistant Examiner* — David Luo
(74) *Attorney, Agent, or Firm* — Bracewell & Giuliani LLP

(57) ABSTRACT

A system for detecting a backspin condition of a motor in an electrical submersible pump is disclosed herein. The system comprises a sensor mounted proximate to the motor, the sensor outputting a signal, a power cable connected between a motor and a controller, the power cable supplying a three phase AC voltage to the motor, one phase of the three phase signal having a control signal thereon; electronics connected to the sensor, the electronics receiving the signal and propagating the signal to the controller; and a computer defining the controller, the controller having a non-transitory memory, a computer processor, and a computer program product stored on the memory and executable by the processor, the computer program product performing a process of controlling the variable speed drive of the motor and a process of monitoring the signal from the sensor to determine if the motor is backspinning.

10 Claims, 13 Drawing Sheets

DEVICE, COMPUTER PROGRAM PRODUCT AND COMPUTER-IMPLEMENTED METHOD FOR BACKSPIN DETECTION IN AN ELECTRICAL SUBMERSIBLE PUMP ASSEMBLY

CROSS REFERENCE TO RELATED APPLICATIONS

This application claims priority to U.S. Provisional Patent Application No. 61/237,405, filed on Aug. 27, 2009 titled "Device and Method for Backspin Detection", and U.S. Provisional Patent Application No. 61/237,415, filed on Aug. 27, 2009 titled "Device and Method for Backspin Detection", which are incorporated by reference herein in their entirety.

BACKGROUND

1. Field of Invention

The present invention relates, in general, to improving the production efficiency of subterranean wells and, in particular, to a device and method which automatically detects when a motor in an electrical submersible pump assembly ("ESP") is backspinning.

2. Description of the Prior Art

Submersible pumps are often used in deep wells for pumping large volumes of liquid to the surface. Often, the pump assembly will be located several thousand feet into the well. The pump assembly normally includes a centrifugal pump, below which is mounted a large alternating current electrical motor for driving the pump.

For various reasons, pumps are often shut down and power to the motor is cut off. When the power to the electrical motor is cut off, the motor will continue to spin along with the pump in a forward direction for a period of time, then the motor will cease spinning in a forward direction and start backspinning as a column of liquid above the pump falls downward into the well. It is important that while the motor is backspinning, the pump is not turned back on as the sudden surge of power to the motor creates extremely high torque on the shaft and may cause the motor shaft to break. Thus, it is important to determine when a motor stops backspinning before restarting the pump.

The current method of detecting a backspinning motor is to monitor the voltage generated by the residual magnetism of the motor. This voltage is proportional to the motor shaft speed and disappears when the motor stops.

SUMMARY OF THE INVENTION

Embodiments of the present invention can detect an occurrence of backspin in an electrical submersible pump assembly and the cessation of backspin in same by measuring a property of a motor associated with an ESP or the fluid in the ESP, and using a controller to compare the measured value to a threshold indicative of a backspin condition. Downhole, the motor can be monitored via mechanical sensor, such as a vibration sensor, rotation sensor, or flow meter. On the surface, fluid properties, pressure, differential pressure, temperature, electrical resistivity, and flow can be measured. Alternatively, current flow and motor impedance can be monitored.

One embodiment of a system for detecting a backspin condition of a motor in an electrical submersible pump comprises: a variable speed drive for powering a motor via a power cable, a controller controlling the variable speed drive and monitoring a current on the power cable to determine if the motor is backspinning, wherein the motor receives no operable level of AC power when the controller determines the motor is backspinning.

An embodiment of a method of controlling power to a motor when, the motor is in backspin comprises the steps of: measuring the impedance of the motor to determine when the motor is backspinning; turning off AC power to the motor when it is determined the motor is backspinning; sending a smaller constant amplitude AC power to the motor while the motor is backspinning; determining when the motor stops backspinning, and sending AC power to the motor when the motor stops backspinning.

A system for detecting a backspin condition of a motor in an electrical submersible pump is also disclosed herein. The system comprises a sensor mounted proximate to the motor, the sensor outputting a signal, a power cable connected between a motor and a controller, the power cable supplying a three phase AC current to the motor, one phase of the three phase signal having a control signal thereon; electronics connected to the sensor, the electronics receiving the signal and propagating the signal to the controller; and a computer defining the controller, the controller having a non-transitory memory, a computer processor, and a computer program product stored on the memory and executable by the processor, the computer program product performing a process of controlling the variable speed drive of the motor and a process of monitoring the signal from the sensor to determine if the motor is backspinning. The computer program product comprises the instructions of: monitoring the signal to determine whether the signal is above a threshold, the threshold for determining whether the signal is a noise signal or a backspin signal, and outputting the backspin signal; impeding operable power levels to the motor, responsive to the backspin signal; monitoring the backspin signal to determine whether the backspin signal is below the threshold; and returning power to the motor responsive to the determination that the backspin signal is below the threshold.

Another embodiment of a method for controlling power to a motor when the motor is in backspin comprises the steps of: sensing a condition of the motor and outputting a signal indicative of the condition; processing the signal to determine whether the signal is a candidate for transmission to a controller that controls power to the motor; transmitting the signal, via a cable that supplies power to the motor, to the controller if the signal is a candidate for transmission; receiving the signal at the controller; processing the signal to determine whether the motor is in backspin; and controlling power to the motor on the basis of whether the motor is in backspin.

A system for determining whether a motor in an electrical submersible pump is backspinning is also described herein. The system comprises a sensor mounted in a well bore proximate to a ground surface, the sensor outputting a backspin signal; a communication link connected to the sensor, the communications link communicating the backspin signal; and a controller receiving the backspin signal from the communications link and processing the backspin signal to determine whether the motor is backspinning, the controller comprising a processor and a computer readable and non-transitory storage media including computer readable instructions stored thereon that when executed causes the controller to perform a process of determining whether the motor is backspinning and a process of determining when the motor has stopped backspinning. The computer readable instructions perform the steps of: monitoring the signal to determine whether the signal is above a threshold, the threshold for determining whether the signal is a noise signal or a backspin signal, and outputting the backspin signal; impeding operable levels of AC power to the motor, responsive to the backspin signal; monitoring the backspin signal to determine whether the backspin signal is below the threshold; and returning AC power to the motor responsive to the determination that the backspin signal is below the threshold.

Another embodiment of a method of controlling power to a electrical submersible pump motor when the motor is backspinning in a wellbore comprises the steps of sensing a condition of the wellbore and outputting a signal indicative of the condition; transmitting the signal to a controller; receiving the signal at the controller; processing the signal to determine whether the motor is in backspin; and controlling power to the motor on the basis of whether motor is in backspin.

BRIEF DESCRIPTION OF DRAWINGS

Some of the features and benefits of the present invention having been stated, others will become apparent as the description proceeds when taken in conjunction with the accompanying drawings, in which.

While the invention will be described in connection with the preferred embodiments, it will be understood that it is not intended to limit the invention to that embodiment. On the contrary, it is intended to cover all alternatives, modifications, and equivalents, as may be included within the spirit and scope of the invention as defined by the appended claims.

DETAILED DESCRIPTION OF INVENTION

The present invention will now be described more fully hereinafter with reference to the accompanying drawings in which embodiments of the invention are shown. This invention may, however, be embodied in many different forms and should not be construed as limited to the illustrated embodiments set forth herein; rather, these embodiments are provided so that this disclosure will be thorough and complete, and will fully convey the scope of the invention to those skilled in the art. Like numbers refer to like elements throughout.

Figure 1:
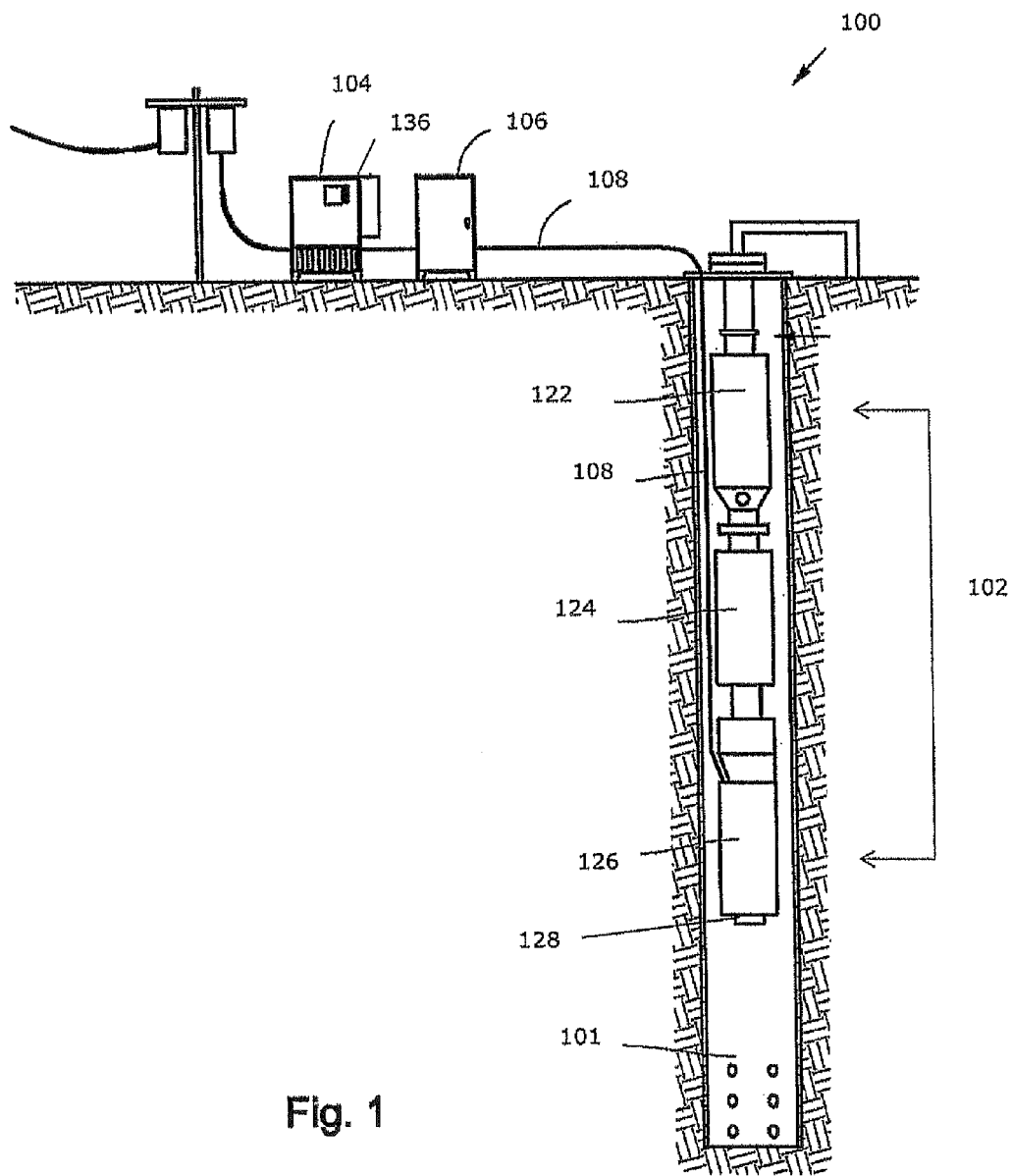
FIG. 1 is a schematic side view of an ESP assembly constructed in accordance with an embodiment of the present invention.

With reference now to FIG. 1, well production system 100 includes ESP 102, motor controller 104, and optionally transformer 106 connected together via power cable 108. As can be seen, ESP 102 extends vertically down into well bore 101, formed in an oil-bearing formation. Fluid flows from apertures in the wellbore and is lifted to the surface by ESP 102.

ESP 102 includes centrifugal pump 122, seal assembly 124, and motor 126 that is connected to AC power via power cable 108, and sensor 128. Specifically, motor 126 receives electrical power to rotate a shaft [not shown]. The rotating shaft is connected to centrifugal pump 122, which uses the rotating shaft of motor 126 to turn impellers [not shown] that apply pressure to the oil and water, and lift same to the surface. Seal assembly 124 is provided between centrifugal pump 122 and motor 126 to transfer motor torque to centrifugal pump 122, as well as to equalize ESP and well bore pressure and isolate motor 126 from well fluid. Sensor 128 and any associated electronics monitors downhole conditions including wellbore pressure, motor temperature, presence of free water, discharge flow rate, discharge pressure and vibration. Sensor 128 may be connected to motor controller 104 via power cable 108, or optionally a separate communications line.

The operation of ESP 102 is controlled by motor controller 104 that controls power delivery to the motor and may act as a controller to monitor the operation of the well pump and the condition of the pump components. Motor controller 104 operates as a power source for the motor by connecting to e.g., a power line delivering three-phase AC power, to deliver the power in a controlled manner, i.e., the power delivered to the motor is free from transients or is a function of some parameter such as fluid flow. Motor controller 104 may be a switchboard, soft starter, or variable speed drive such as a pulse width modulated variable frequency drive, though a variable speed drive is preferred. Data monitoring and control device 136 is part of motor controller 104 provides the "brains" of the system and will be discussed in detail below. As can be seen, motor controller 104 and data monitoring and control device 136 are connected to the motor and any sensors downhole via power cable 108, disposed along the inside of wellbore 101.

Power cable 108 provides power and optionally communications between motor controller 104 and motor 126. Typically, power cable 108 connects to a motor lead extension (not shown) proximate to the pumping system. Motor lead extension continues in the well bore 101 adjacent the pump assembly and terminates in what is commonly referred to as a "pothead connection" at motor 126. As one skilled in the art will appreciate, power cable 108 typically extends thousands of feet and thereby introduces significant electrical impedance between motor controller 104 (or step-up transformer) and motor 126.

Figure 2:
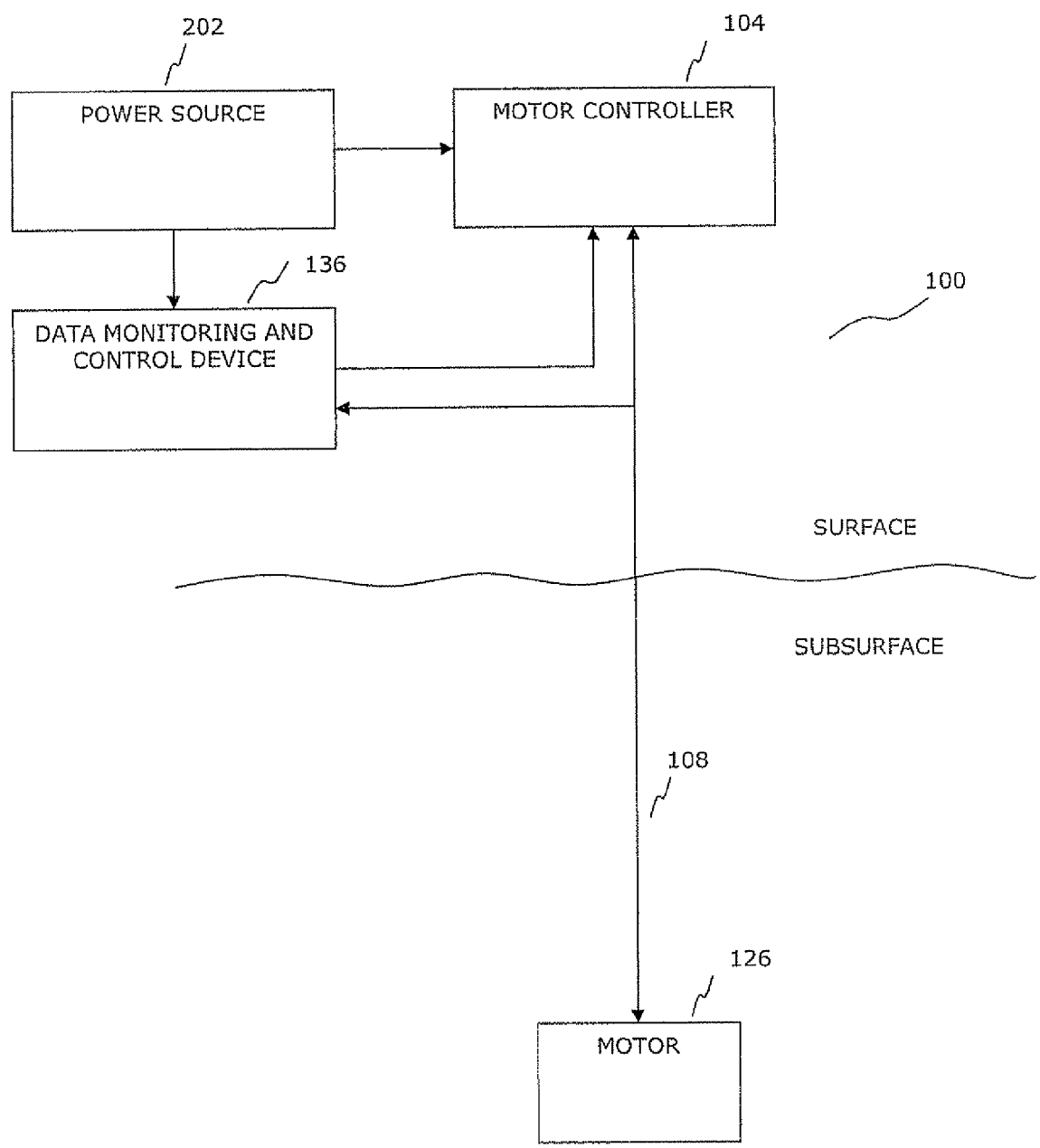
FIG. 2 is a block diagram of the ESP assembly constructed in accordance with an embodiment of the present invention.

FIG. 2 illustrates a block diagram of an exemplary embodiment of well production system 100. As shown, system 100 includes a power source 202, a motor controller 104, a data monitoring and control device 136, and a motor 126. As previously mentioned, power source 202 provides power to motor controller 104, so that motor controller 104 can deliver power to motor 126. Power source 202 also provides power to the circuitry of motor controller 104 and data monitoring and control device 136. Motor controller 104 is connected to power source 202 and delivers a controlled voltage to motor 126 in response to various sensed conditions of the motor and/or other control parameters as instructed by data monitoring and control device 136. As one skilled in the art will appreciate, because the electronics of motor controller 104 are powered by power source 202, motor controller 104 also includes circuitry to convert, e.g., a three-phase AC current, into a DC current suitable for the operation of computer circuitry.

Data monitoring and control device 136 is really the "brains" of well production system 100, and controls motor controller 104 by controlling such parameters as on/off, frequency (F), and/or voltages each at one of a plurality of specific frequencies, which effectively varies the operating speed of motor 126. Data monitoring and control device 136 is powered via power source 202 and is also connected to motor controller 104 and power cable 108.

As can be seen in the embodiment shown in FIG. 2, data control and monitoring device 136 is connected to power cable 108 driving motor 126. In this embodiment, data monitoring and control device 136 is monitoring the input current and/or input impedance on the power cable to determine backspin. Once motor 126 is backspinning, motor controller 104 impedes three-phase AC power from motor 126. In order for data control and monitoring device 136 to monitor the current flowing in the power cable 108 with AC power disrupted, data control and monitoring device 136 may direct motor controller 104 to input an AC voltage to the power cable 108 to monitor the change in current as motor 126 slows, or input an intermittent low voltage to monitor input impedance on power cable 108. As one skilled in the art will also appreciate, any intermittent or AC voltage sent across motor 126 used for this measurement would not cause damage or harm to the rotor as would be the case if motor 126 was fully powered on.

Figure 3:
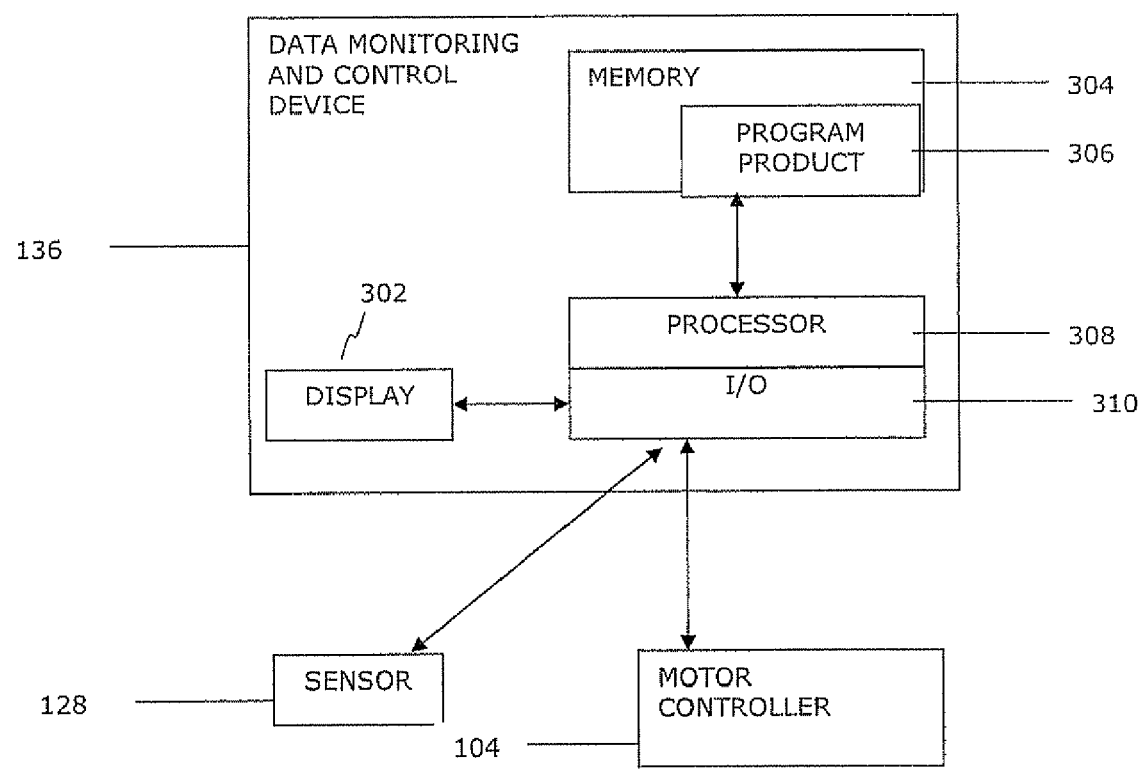
FIG. 3 is block diagram of a data monitoring and control device having computer program product stored in memory thereof according to an embodiment of the present invention.

A block diagram depicting the various components of data monitoring and control device 136 is shown with reference to FIG. 3. Data monitoring and control device 136 includes display 302 for displaying data to a user at, e.g., a control center various monitored conditions of the well and ESP including backspin, memory 304 for storing sensor data and program product 306, a processor 308 for executing the instructions of program product 306, and input/output ("I/O") device 310 for receiving data from sensor 128 and motor controller 104.

As one skilled in the art will appreciate, I/O device 310 includes all necessary components and hardware for converting a signal into a digital signal for use by processor 308 and outputting control signals for the operation of motor controller. These additional components could include an A/D or D/A converter, an amplifier, filters, etc., as required by the method of acquiring sensor data and controlling motor controller 104. In its basic form, I/O device can be any I/O device including, but not limited to a card/controller connected by a PCI bus to the motherboard of control device 136, or hardware built into the motherboard of the control device 136 to the sensor and motor controller.

Processor 308 is the "brains" of the control circuit, and as such executes program product 306 and works in conjunction with the I/O device 310 to direct data to memory 304 and to load data from memory 304 to execute the program product. Processor 308 can be, e.g., any commercially available processor, or plurality of processors, adapted for use in an data monitoring and control device 136, e.g., Intel® Xeon® multicore processors, Intel® micro-architecture Nehalem, AMD Opteron™ multicore processors, etc. As one skilled in the art will appreciate, processor 308 may also include components that allow the data monitoring and control device 136 to be connected to a display [not shown] and keyboard that would allow, for example, a person in the control station access to the processor 308 and memory 304.

Memory 304 may store the algorithms forming the computer program product of the instant invention and data, and such, memory 304 may consists of both non-volatile memory, e.g., hard disks, flash memory, optical disks, and the like, and volatile memory, e.g., SRAM, DRAM, SDRAM, etc., as required by embodiments of the instant invention. As one skilled in the art will appreciate, though memory 304 is depicted on, e.g., the motherboard, of the data monitoring and control device 136, memory 304 may also be a separate component or device, e.g., FLASH memory, connected to the data monitoring and control device 136.

Figure 4:
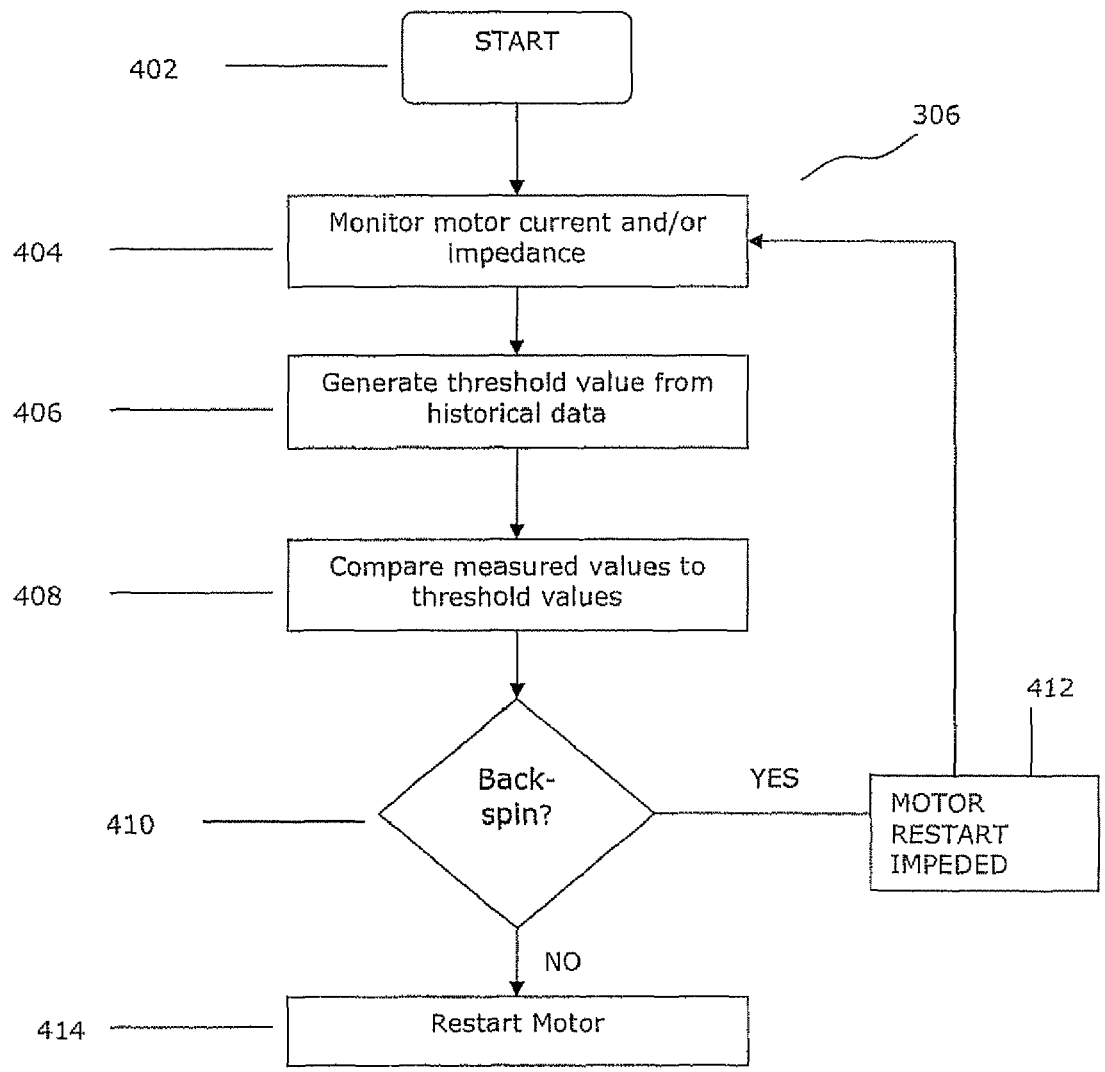
FIG. 4 is a flow diagram for a method of detecting backspin according to an embodiment of the present invention.

Program product 306 is stored in memory 304 and is used by the processor 308 to perform the basic functions of the device. One embodiment of a program product according to the invention is shown in FIG. 4. As shown, the process starts when motor 126 is stopped after normal operation (step 402). Once the process starts, current to motor 126 is constantly measured by tapping into the power cable 108 (step 404). Each measured current value is recorded and a threshold range indicating a backspin event is occurring is generated (step 406). The threshold range may be generated from historically observed current data from backspinning motors, or may be calculated from observing the input impedance of motor 126. As one skilled in the art will appreciate, the measured current data can also be used to refine the threshold range, for use later in the process. In step 408, the measured current data is compared to the threshold range. And, in step 410, it is determined whether the results of the comparison in step 408 indicate motor 126 is backspinning. If motor 126 is backspinning, the process makes sure power to a restart of the motor 126 is inhibited (step 412) and directs motor controller 136 to input either an AC voltage or input power on an intermittent basis. The process then returns to step 404 and continues to monitor the current and/or impedance on power cable 108. When the processor determines the measured value is outside of the threshold range for backspin, motor 126 is restarted (step 412). As can be seen, program product 306 can detect when a motor starts backspinning and when a motor stops backspinning.

Figure 5:
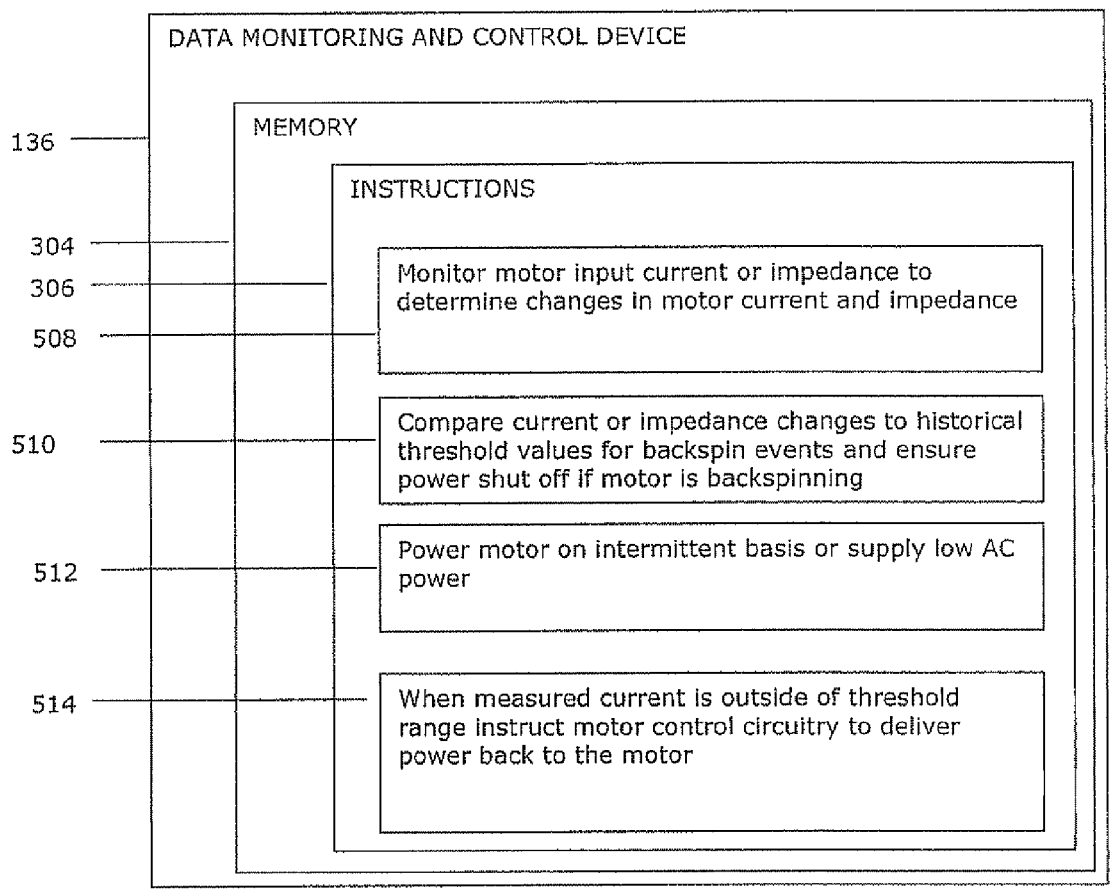
FIG. 5 is a schematic diagram of controller for detecting backspin according to an embodiment of the present invention.

A schematic of data monitoring and control device 136 according to an embodiment of the invention is shown with reference to FIG. 5, and includes a memory 304 for storing program product 306. Program product 306 include the instruction 508 to monitor the current or impedance on the power cable 108; instruction 510 to compare measured current or impedance to historical threshold current/impedance range for a backspinning motor and to impede operable three-phase AC power to motor 126 when motor 126 is backspinning; an instruction 512 to supply power to motor 126 on an intermittent basis or supply motor 126 with a low AC voltage and an instruction 514 to power back on motor 126 when the measured current is outside of the threshold current/impedance range indicating motor 126 has stopped backspinning.

Figure 6:
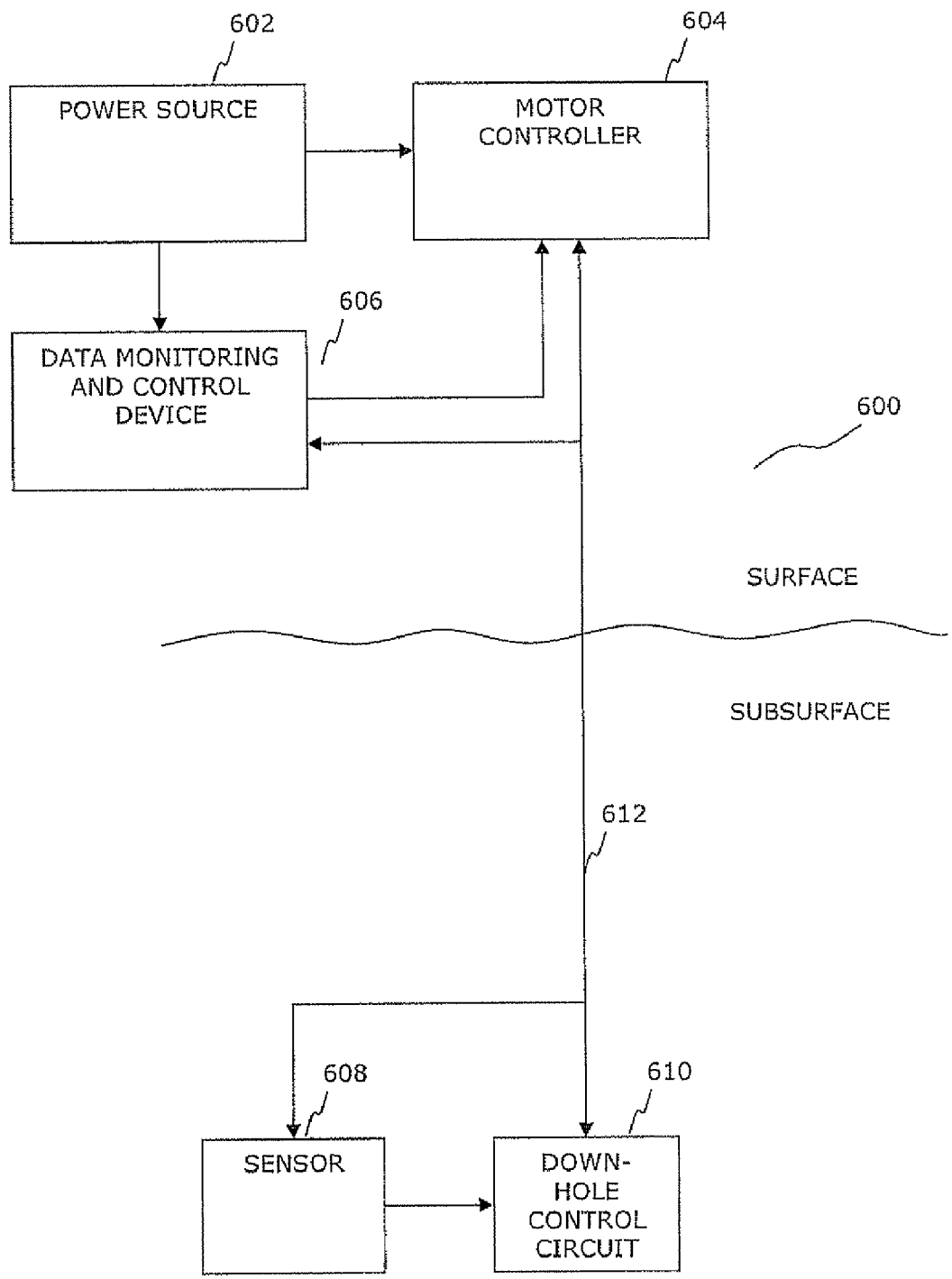
FIG. 6 is a block diagram of the ESP assembly constructed in accordance with an embodiment of the present invention.
Figure 7A:
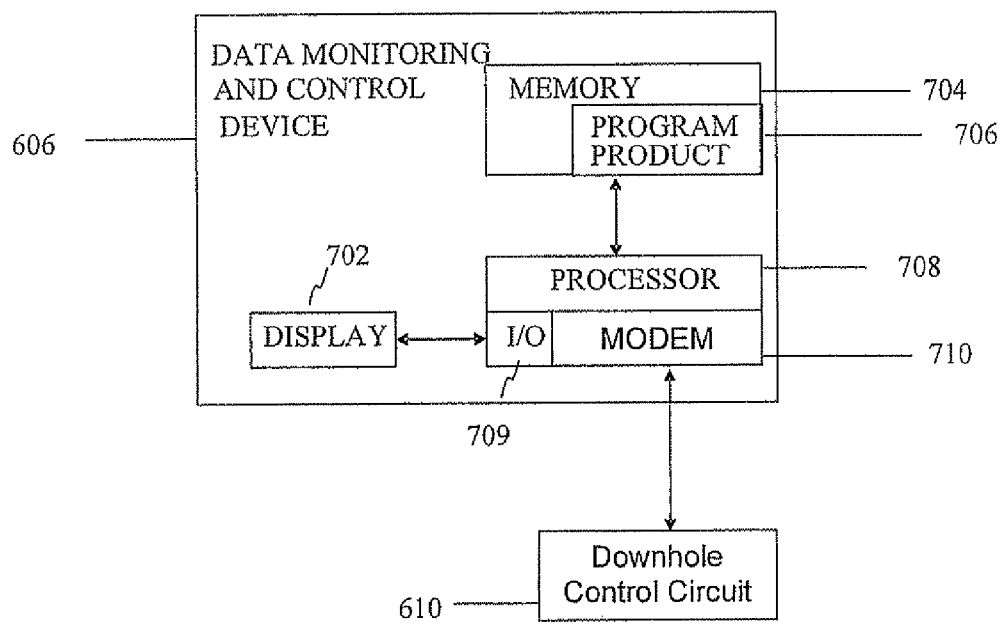
FIG. 7A is a block diagram of a data monitoring and control device having a computer program product stored in memory thereon according to an embodiment of the present invention.
Figure 7B:
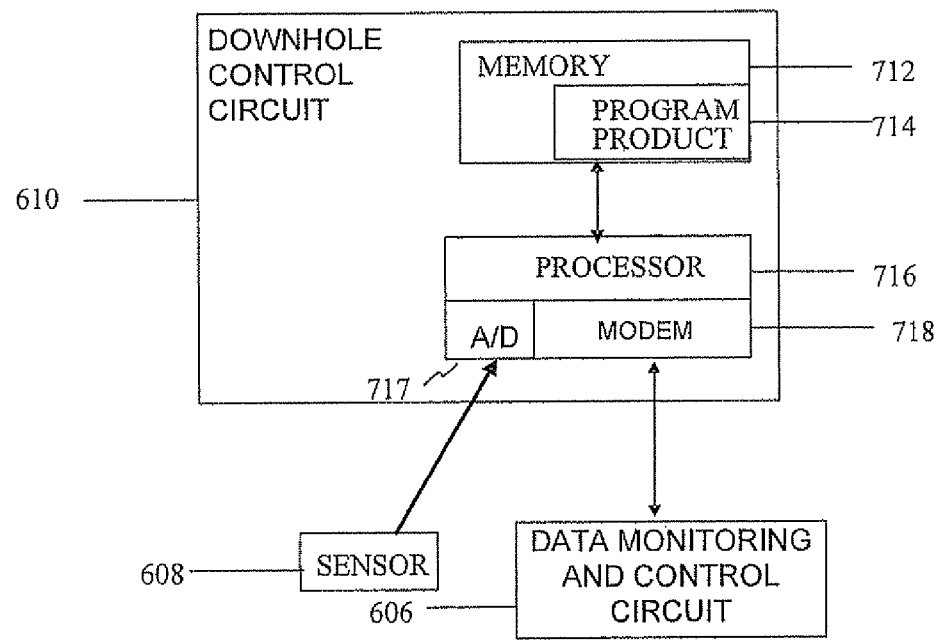
FIG. 7B is a block diagram of a downhole control circuit for controlling the motor and monitoring a sensor according to an embodiment of the present invention.
Figure 8:
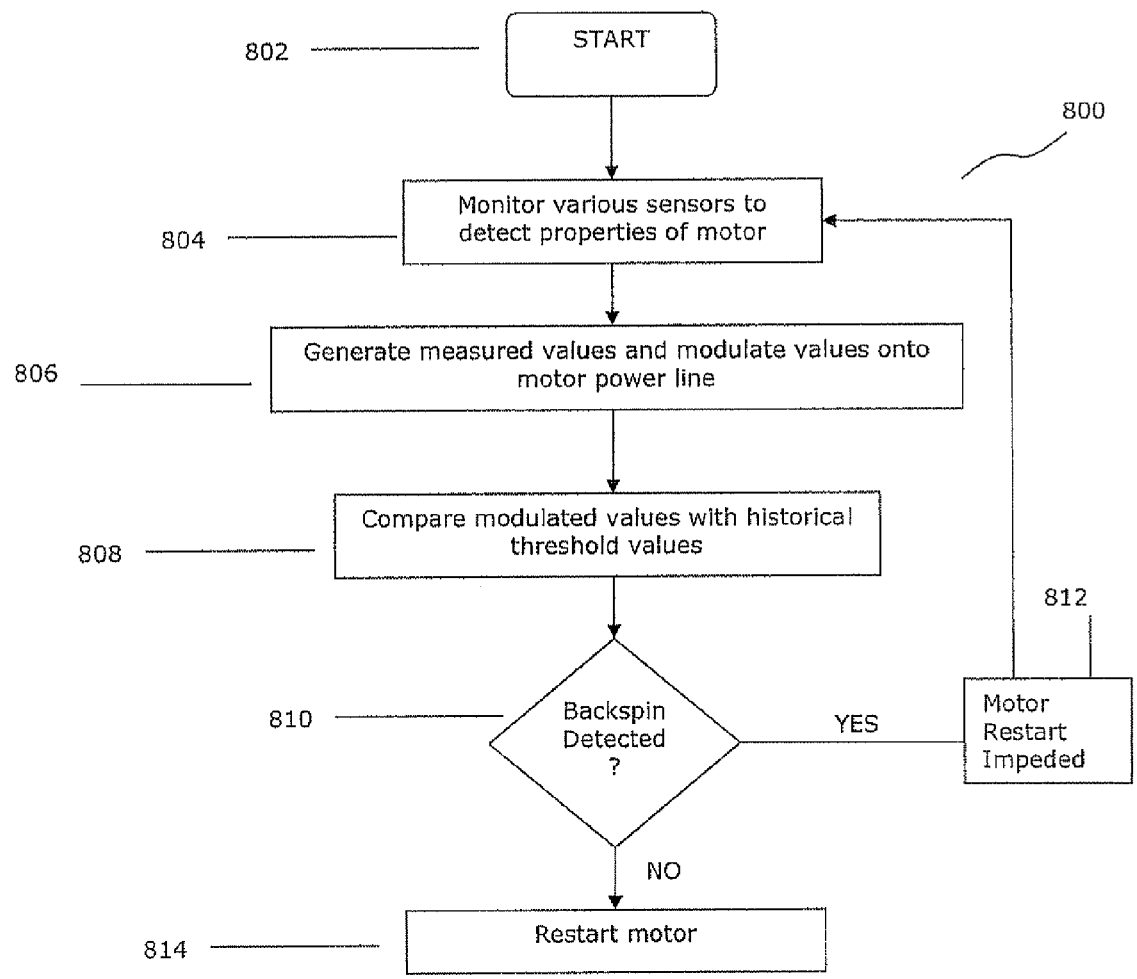
FIG. 8 is a flow diagram for a method of detecting backspin according to an embodiment of the present invention.

Another embodiment of the present invention is shown in FIGS. 6-8. A block diagram of a well production system 600 according to this embodiment is shown in FIG. 6 and includes a power source 602, a motor controller 604, a data monitoring and control device 606, a sensor 608, a downhole control circuit 610, and a power cable 612. Like the previous embodiment, power source 602 provides power to motor controller 604, so that motor controller 604 can deliver power to a motor

[not shown]. Power source 602 also provides power to the circuitry of motor controller 604 and data monitoring and control device 606. Motor controller 604 is connected to the power source 602 and delivers a controlled voltage to the motor [not shown], a downhole control circuit 610, and sensor 608 in response to various sensed conditions of the motor and/or other control parameters as instructed by data monitoring and control device 606. As one skilled in the art will appreciate, because the electronics of motor controller 604 are powered by power source 602, motor controller 604 also includes circuitry to convert, e.g., a three-phase AC current, into a DC current suitable for the operation of computer circuitry.

Downhole control circuit 610 and sensor 608 are connected to data monitoring and control device 606 via bi-directional link [not shown], e.g., optical fiber, or power cable 612. Sensor 608 can be any temperature, vibration, rotational, or pressure sensors, such as an accelerometer, a strain gauge, a thermocouple, thermister, piezo, fiber optic sensor or the like. As is understood in the art, each of these sensors emits an electrical signal in response to a change in a sensed condition and can monitor pump discharge pressure, pump intake pressure, tubing surface pressure, vibration, ambient well bore fluid temperature, motor voltage and/or current, motor oil temperature, etc.

Downhole control circuit 610 may process the signal received from sensor 608 and output signals that are significant for data collection purposes, i.e., excludes transients and signals that indicate operation well within a normal range. To achieve this end, downhole control circuit 610 may include a modulator/demodulator (modem) to modulate the signal on power cable 612, an amplifier to amplify the signal prior to modulation, and intermittent processing circuitry to process the signal, i.e., a bandpass or other filter and/or a circuit to generate a digital signal indicative of a particular measured value, etc. To output sensor signals that are significant, downhole control circuit 610 enables the propagation of significant signals on power cable 612 or a communications link between the sensor 608 and data monitoring and control device 606. The circuitry to perform this task, i.e., modulate or otherwise propagate the signal have been described in U.S. Pat. No. 6,587,037, entitled METHOD FOR MULTI-PHASE DATA COMMUNICATIONS AND CONTROL OVER AN ESP POWER CABLE and U.S. Pat. No. 6,798,338, entitled RF COMMUNICATION WITH DOWNHOLE EQUIPMENT, which are incorporated by reference herein.

Importantly, because efficient detection of backspin requires a high sample rate, which is impossible to achieve when propagating signals up to data monitoring and control device 606 on power cable 612, downhole control circuit 610 can achieve the high sample rate required and only transmit sequences that are significant for the detection of backspin on the power cable 612 every, e.g., 30-60 seconds.

Data monitoring and control device 606 is really the "brains" of the well production system 600, and controls motor controller 604 by controlling such parameters as on/off, frequency (F), and/or voltages each at one of a plurality of specific frequencies, which effectively varies the operating speed of the motor [not shown]. Data monitoring and control device 606 is powered via power source 602 and monitors the communications link or power cable 612 for data signals indicative of a downhole sensed condition. The process of demodulating signals from power cable 612 is known and is also described in U.S. Pat. No. 6,587,037, entitled METHOD FOR MULTI-PHASE DATA COMMUNICATIONS AND CONTROL OVER AN ESP POWER CABLE and U.S. Pat. No. 6,798,338, entitled RF COMMUNICATION WITH DOWNHOLE EQUIPMENT.

When a sensed condition indicates the motor [not shown] in the ESP is backspinning, data monitoring and control device 606 ensures the three phase AC power required to operate the motor [not shown] is not delivered to same, and continues to monitor the condition of the motor to determine when backspin has ceased. To do this, data monitoring and control device 606 may instruct motor controller 604 to send a DC current to the sensors and down hole circuit so those devices may receive power or may send voltage across only one phase of the three-phase AC voltage used to supply power to downhole circuitry. Alternatively, the sensor 608 and downhole circuit 610 may be powered by a rechargeable battery or the like that provides power when no current is flowing to the motor [not shown].

As one skilled in the art will appreciate, the structure of data monitoring and control device 606 according to this embodiment is similar to that of the block diagram depicted in FIG. 3, but data monitoring and control device 606 communicates with a downhole control circuit 610. The data monitoring and control circuit 606 includes display 702 for allowing an operator to monitor the condition of the wellbore and motor, memory 704 for storing program product 706, processor 708 for executing the program product, I/O device 709 for sending and receiving data from monitor 302 and various other components, and modem 710 for modulating a signal onto a power signal for receipt by the downhole control circuit 610 or sensor 608.

In its basic form, I/O device 709 can be any I/O device including, but not limited to a network card/controller connected by a PCI bus to the motherboard of control device 606, or hardware built into the motherboard of the control device 606 to the sensor and motor controller. The I/O device 709 can include a modem 710 that is adapted to communicate with the downhole control circuit 610. The modem 710 can be adapted as part of the data monitoring and control device, or configured as a separate component with, e.g., the power supply, for receiving a signal to modulate onto the downhole power signal. In such a system, the I/O device 709 would output a control signal to the external modem so that the control signal can be propagated down the well bore to the downhole control circuit 610. Optionally, however, a transceiver (not shown) may be used in place of the modem, as is known in the art.

Processor 708 is the "brains" of the control circuit, and as such executes program product 706 and works in conjunction with the I/O device 709 to load data from memory 704 to execute the program product. Processor 708 can be, e.g., any commercially available processor, or plurality of processors, adapted for use in a data monitoring and control device 606, e.g., Intel® Xeon® multicore processors, Intel® micro-architecture Nehalem, AMD Opteron™ multicore processors, etc. As one skilled in the art will appreciate, processor 708 may also include components that allow the data monitoring and control device 606 to be connected to a display 702 and keyboard that would allow, for example, an operator direct access to the processor 708 and memory 704.

Memory 704 may store the algorithms forming the computer program product of the instant invention and data, and such, memory 704 may consists of both non-volatile memory, e.g., hard disks, flash memory, optical disks, and the like, and volatile memory, e.g., SRAM, DRAM, SDRAM, etc., as required by embodiments of the instant invention. As one skilled in the art will appreciate, though memory 704 is depicted on, e.g., the motherboard of the data monitoring and control device 606, memory 704 may also be a separate component or device, e.g., FLASH memory, connected to the data monitoring and control device 606.

Downhole control circuit 610 may also be included to monitor the condition of the wellbore locally, i.e., downhole. The downhole control circuit comprises memory 712, program product 714, processor 716, A/D converter 717, and modem 718. The modem 718 receives the signal from the data monitoring and control device, modulated onto one of the phases of the power supply, and processes the modulated signal into one that is capable of being processed by the downhole control circuit to, e.g., send signals to downhole equipment including the motor controller to adjust the speed of the motor, the sensors, etc. In addition, the modem may convert a monitoring signal from sensor 608 into a signal that may be modulated onto the power supply cable for communication with the data monitoring and control device. In this way, the data monitoring and control device and the control circuit 610 may communicate. Optionally, however, a transceiver (not shown) may be used in place of the modem, as is known in the art.

A/D converter 717 is provided in the downhole control circuit 610 to convert a sensed signal, e.g., backspin, into a signal that may be processed by the downhole control circuit 610, and as such may be any A/D device as is commonly know for converting analog signals into digital signals. The A/D device 717 is connected to the processor 716, and memory 712, which functions much like their counterparts in the data monitoring and control device. However, as will be appreciated by those of skill in the art, the electronics components used in the downhole control circuit must be capable of withstanding temperatures of at least 125 degrees Celsius and pressures of 20,000 psi. Accordingly, special processors, A/D converters, memory, and other devices such as transceivers, power modules, clocks, etc., that while not shown, may be used in the downhole control circuit, are devices manufactured to withstand harsh environments, like the component packages manufactured by Texas Instruments®, Intel®, and others.

Importantly, though the program product 706 is depicted as providing the computing function of the instant inventions, there are embodiments where the downhole control circuit could store a the program product 706 as program product 714, so that the motor could be monitored and stopped more quickly in the event a backspin is detected.

Returning to the figures, one embodiment of a program product 706 according to the invention has instructions that perform the process shown in FIG. 8. As can be seen, in step 802, the process is started, i.e., the motor [not shown] is powered off. Once the process starts, in step 804, power cable 612 is monitored to detect signals that may have been modulated on same. Measured values are generated from signals demodulated from power cable 612, in step 806. Each measured value is recorded and it is determined whether the measured value is within a threshold range indicating either a backspin event is occurring, or that a backspin event has stopped in step 808. The threshold range may be generated from historically observed data from backspinning motors and updated with the measured values. In step 810, the measured value data is compared to the threshold range and it is determined whether the results of the comparison indicate the motor is backspinning. For example, if sensor 608 is a pressure sensor, pressure across the centrifugal pump can be measured. When the system is back spinning, the pressure drop across the pump will decrease as the flow of the fluid back down the pump discharge slows as the system reaches equilibrium. At equilibrium, the pressure across the pump will be zero. A restart could be allowed if the pressure is determined by a system model in software that the reverse flow is low enough to avoid high torque starts. If the sensor is a rotational sensing device, the system would compare the direction of rotation and rotational speed to determine whether to allow a restart of the system. If the motor is backspinning, the process makes sure operable levels of power to the motor is impeded (step 812). The process then returns to step 804, where motor or downhole conditions are monitored via power cable 612. When the processor determines the measured value is outside of the threshold range, the motor is restarted in step 814. As can be seen, these steps allow for both the detection of the backspin event and the determination of when the backspin event has ceased.

Figure 9:
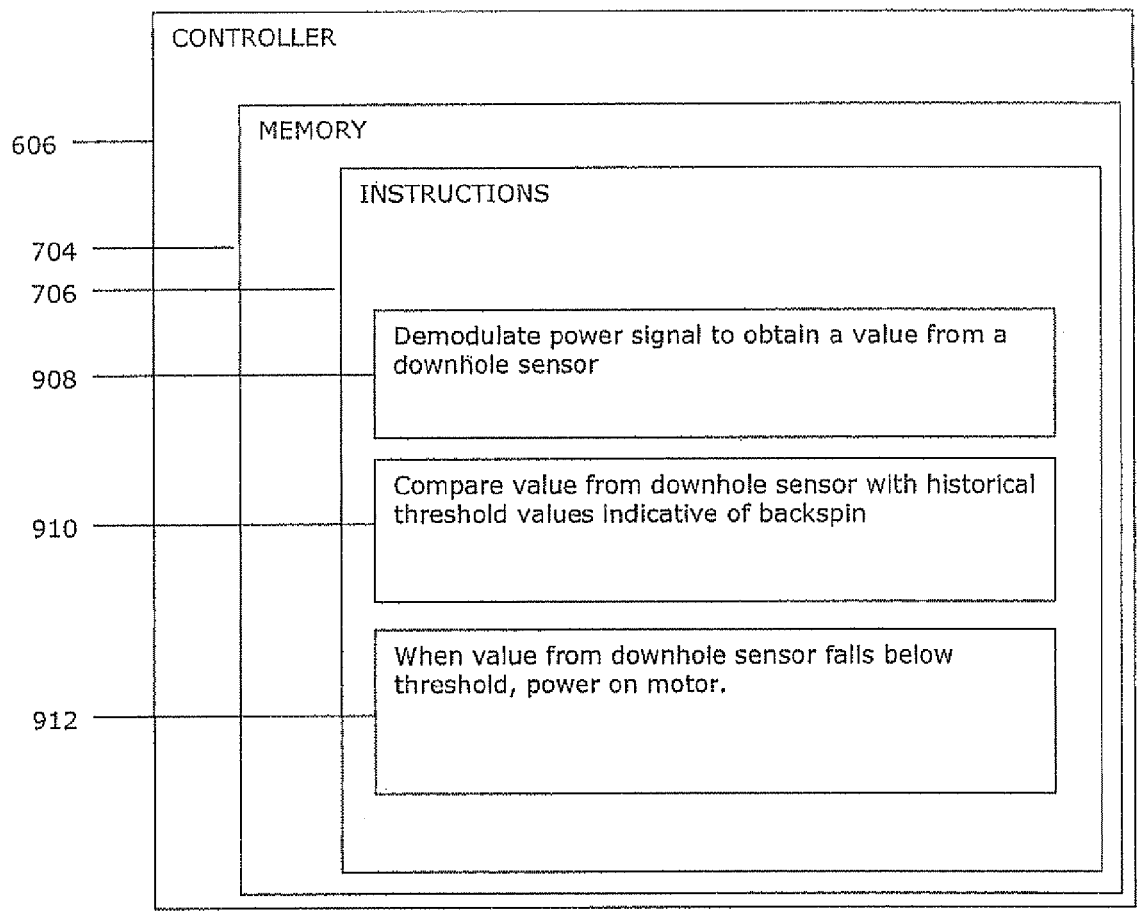
FIG. 9 is a schematic diagram of controller for detecting backspin according to an embodiment of the present invention.

A schematic of program product 706 stored on the memory of data monitoring and control device 606, and operable thereon, according to the above embodiment of the invention is shown with reference to FIG. 9. As shown, the data monitoring and control device includes a memory 904 for storing program product 706. Program product 706 include the instruction 908 to demodulate power signal received on power cable 612 to obtain a measured value from the downhole, instruction 910 to compare the measured value to historical threshold range for backspin events and to impede AC power to motor when a backspin is detected; and an instruction 912 to power back on the motor when the measured value is outside of the threshold range indicating the backspin event is over.

In use, backspin detection method and system may be implemented with various sensors placed downhole.

For example, if sensor 608 is an accelerometer, the sensor 608 may be placed on the motor shaft [not shown] to sense an acceleration value of same, the vibration of the motor shaft, or the rotational movement of the motor shaft. The sensed value (acceleration, vibration, rotation, etc) can be processed by the downhole control circuit 610 and sent to data monitoring and control device 606. Either the downhole control circuit 610 or data monitoring and control device 606 can covert the sensed data into data that can be used to determine when the motor stops backspinning or the backspinning has slowed to a speed that makes re-starting the motor feasible. For example, if the downhole control circuit 610 or data monitoring and control device 606 is programmed to interpret the accelerometer signals as acceleration signals, the downhole control circuit 610 or data monitoring and control device 606 can use the acceleration signal to extrapolate the velocity of the motor—then determine when the velocity of the motor shaft approaches a safe starting speed. In another example, if the downhole control circuit 610 or data monitoring and control device 606 is programmed to interpret the accelerometer signals as rotation signals, the downhole control circuit 610 or data monitoring and control device 606 can use the rotation signal to extrapolate when the motor stops rotating in a particular direction—to thereby determine when backspin has stopped. Still in another example, if the downhole control circuit 610 or data monitoring and control device 606 is programmed to interpret the accelerometer signals as vibration signals, the downhole control circuit 610 or data monitoring and control device 606 can use the vibration signal to determine when the motor stops backspinning via, e.g., a frequency shift in the vibration signal. And, sensor 608 does not have to be placed on the motor shaft to detect backspin. The accelerometer could detect the vibration of the motor housing, with the downhole control circuit 610 or data monitoring and control device 606 using these vibration signals to determine when the motor has stopped backspinning.

In another example of use, if sensor 608 is a strain gauge or flow meter, the sensor 608 may be placed in the wellbore to determine when the column of fluid stops falling through the pump on the motor shaft [not shown], pressure changes around the motor, or to sense the torque of the motor's shaft [not shown]. All of these sensed values can be processed by the downhole control circuit 610 and sent to data monitoring and control device 606. Either the downhole control circuit 610 or data monitoring and control device 606 can covert the sensed data into data that can be used to determine when the motor stops backspinning or the backspinning has slowed to a speed that makes re-starting the motor feasible. For example, if the downhole control circuit 610 or data monitoring and control device 606 is programmed to interpret the flow meter signals, the downhole control circuit 610 or data monitoring and control device 606 can use the flow meter signal to extrapolate when the flow nears a threshold that would be indicate the motor has slowed enough for a re-start. In another example, if the downhole control circuit 610 or data monitoring and control device 606 is programmed to interpret the strain gauge signals as torque or pressure signals, the downhole control circuit 610 or data monitoring and control device 606 can use the strain gauge signal to extrapolate when the motor stops or substantially stops rotating in a particular direction via a shift in the pressure signal.

Figure 10:
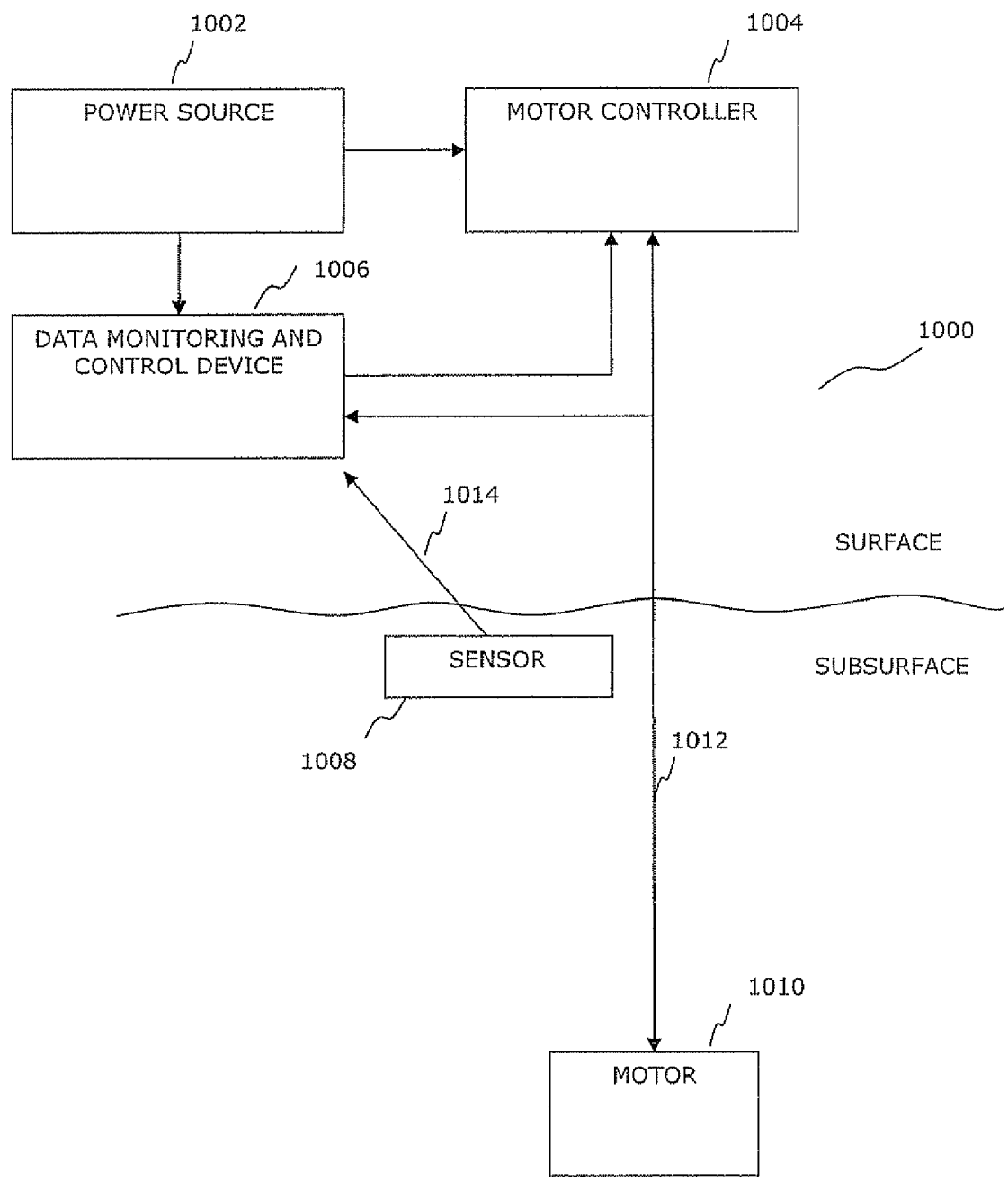
FIG. 10 is a block diagram of the ESP assembly constructed in accordance with an embodiment of the present invention.

Another embodiment of the invention will be described with reference to FIGS. 10-13. A block diagram of a well production system 1000 according to this embodiment is shown in FIG. 10 and includes a power source 1002, a motor controller 1004, a data monitoring and control device 1006, a sensor 1008, a motor 1010 and a power cable 1012. Like the previous embodiments, power source 1002 provides power to motor controller 1004, so that motor controller 1004 can deliver power to motor 1010. Power source 1002 also provides power to the circuitry of motor controller 1004 and data monitoring and control device 1006. Motor controller 1004 is connected to power source 1002, delivers a controlled voltage to motor 1010 via power cable 1012, and optionally sensor 1008, in response to various sensed conditions of motor and/or other control parameters as instructed by data monitoring, and control device 1006. As one skilled in the art will appreciate, since the electronics of motor controller 1004 are powered by power source 1002, motor controller 1004 also includes circuitry to convert, e.g., a three-phase AC current, into a DC current suitable for the operation of computer circuitry.

Sensor 1008 is connected to data monitoring and control device 1006 via a bi-directional link 1014. Sensor 1008 can be any temperature, vibration, rotational, or pressure sensors, such as an accelerometer, a strain gauge, a thermocouple, thermister, piezo, fiber optic sensor or the like. As is understood in the art, each of these sensors emits an electrical signal in response to a change in a sensed condition like pressure, temperature, etc. This signal is output to data monitoring and control device 1006. Sensor 1008 may include an A/D converter to convert the signal from an analog to digital signal for transmission on a communications link, an amplifier to amplify the signal prior to signal propagation, intermittent processing circuitry to process the signal, i.e., filter a signal and/or generate a digital signal indicative of a particular measure value, etc. But, because sensor 1008 is more directly connected to data monitoring and control device 1006, sensor readings can be taken directly by data monitoring and control device 1006 with a high sample rate.

Data monitoring and control device 1006 is really the "brains" of well production system 1000, and controls motor controller 1004 by controlling such parameters as on/off, frequency (F), and/or voltages each at one of a plurality of specific frequencies, which effectively varies the operating speed of motor 1010. Data monitoring and control device 1006 is powered via power source 1002 and receives data signals via communications link 1014 indicative of a sensed condition near the top of wellbore 101. When a sensed condition indicates motor 1010 in the ESP is backspinning, data monitoring and control device 1006 impedes operable power to motor 1010, and continues to monitor the condition of motor 1010 to determine when backspin has ceased. To do this, data monitoring and control device may instruct motor controller 1004 to send a DC current to the sensors so those devices may receive power or may send voltage across only one phase of the three-phase AC voltage used to supply power downhole. Alternatively, sensor 1008 may be powered by a rechargeable battery or the like that provides power when no current is flowing to motor 1010.

Figure 11:
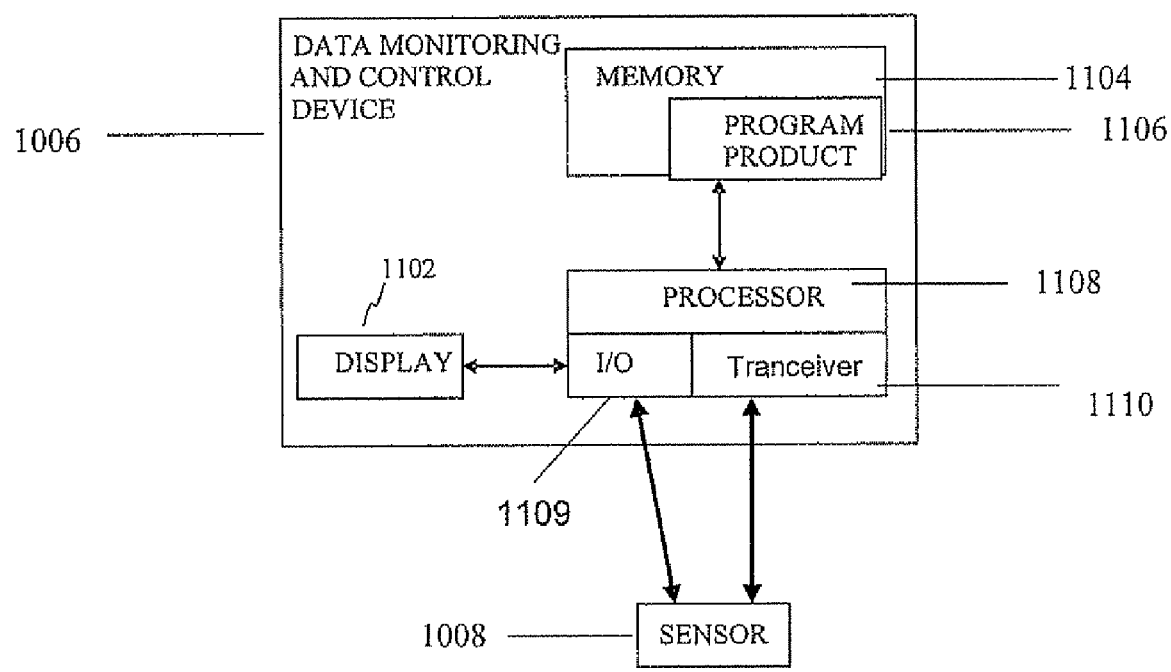
FIG. 11 is a block diagram of a data monitoring and control device having a computer program product stored in memory thereon.

As one skilled in the art will appreciate, the structure of data monitoring and control device 1006 according to this embodiment is similar to that of the block diagram depicted in FIG. 3, but data monitoring and control device 1006 includes a program product 1006. Specifically, data monitoring and control device 1006 is shown in FIG. 11. The data monitoring and control device 1006 includes display 1102 for allowing an operator to monitor the condition of the wellbore and motor, memory 1104 for storing program product 1106, processor 1108 for executing the program product, 110 device 1109 for sending and receiving data from sensor and various other components, and transceiver 1110 for sending and receiving signals from sensor 1008. In its basic form, I/O device 1109 can be any I/O device 1109 including, but not limited to a network card/controller connected by a PCI bus to the motherboard of control device 1006, or hardware built into the motherboard of the control device 136 to the sensor and motor controller. Because the I/O device may receive analog signals from sensors and other components, the I/O device 1109, may also include A/D converters, etc., as is known in the art.

Processor 1108 is the "brains" of the control circuit, and as such executes program product 1106 and works in conjunction with the I/O device 1109 to load data from memory 1104 to execute the program product. Processor 1108 can be, e.g., any commercially available processor, or plurality of processors, adapted for use in an data monitoring and control device 1006, e.g., Intel® Xeon® multicore processors, Intel® micro-architecture Nehalem, AMD Opteron™ multicore processors, etc. As one skilled in the art will appreciate, processor 1108 may also include components that allow the data monitoring and control device 1006 to be connected to an external display [not shown] and keyboard that would allow, for example, an administrative user direct access to the processor 1108 and memory 1104.

Memory 1104 may store the algorithms forming the computer program product of the instant invention and data, and such, memory 1104 may consists of both non-volatile memory, e.g., hard disks, flash memory, optical disks, and the like, and volatile memory, e.g., SRAM, DRAM, SDRAM, etc., as required by embodiments of the instant invention. As one skilled in the art will appreciate, though memory 1104 is depicted on, e.g., the motherboard, of the data monitoring and control device 1006, memory 1104 may also be a separate component or device, e.g., FLASH memory, connected to the data monitoring and control device 1006.

Figure 12:
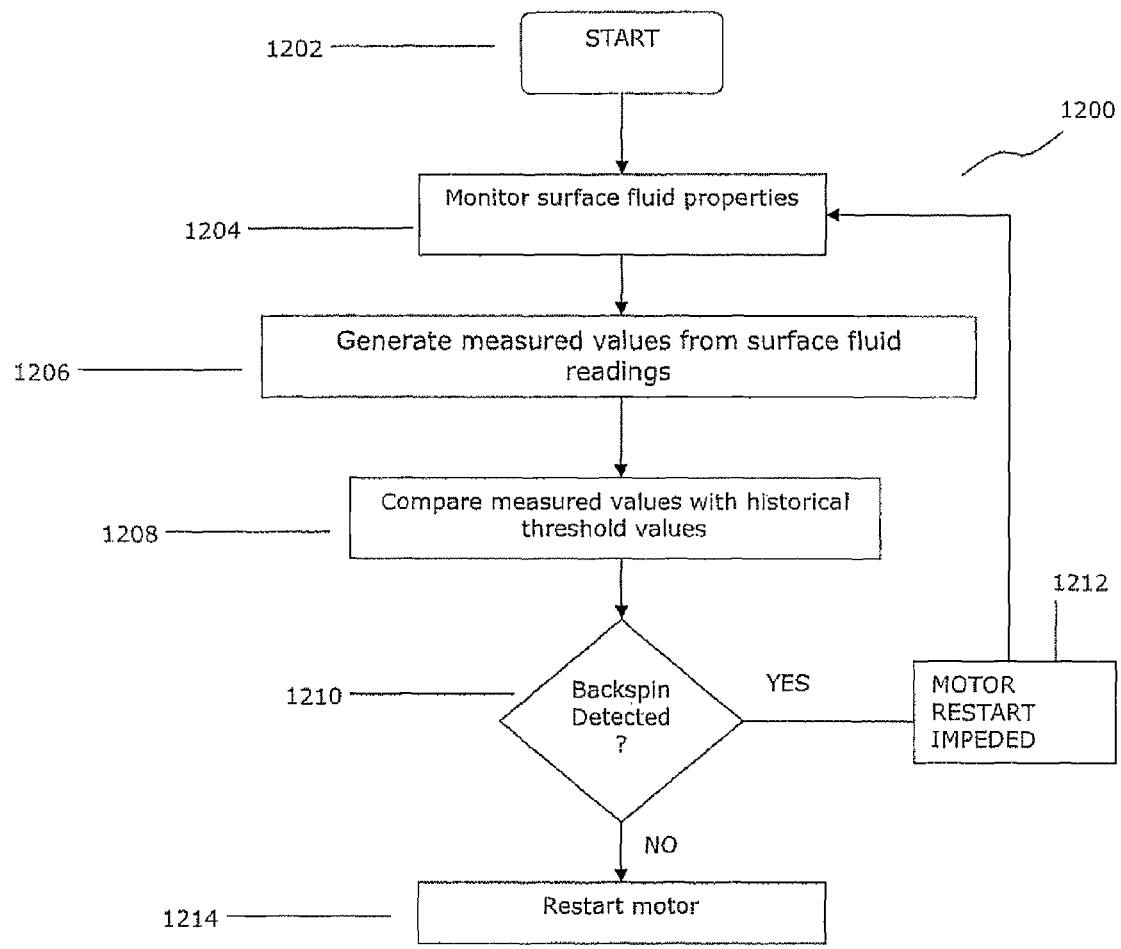
FIG. 12 is a flow diagram for a method of detecting backspin according to an embodiment of the present invention.

Program product 1006 according to this embodiment of the invention is shown in FIG. 12. As shown, in step 1202, the process is started, i.e., motor 1010 is powered down. Once program product 1006 starts, in step 1204, communications link 1014 is monitored to detect signals that may have been propagated on same. Measured values are generated from signals demodulated from power cable 1012, in step 1206. Each measured value is recorded and threshold range indicating either a backspin event is occurring, or that a backspin event has stopped are generated in step 1208. The threshold range may be generated from historically observed data from backspinning motors and updated with the measured values. In step 1210, the measured value data is compared to the threshold range and it is determined whether the results of the comparison indicate motor 1010 is backspinning. For example, if sensor 1008 is a temperature sensor the temperature sensor could approximate the pump discharge and historical data could be used to determine at what temperature the back flow is minimized to the point where a restart can occur. A vibration level sensor approximate to the pump discharge could also be used to determine a safe starting condition based on historical information. If motor 1010 is backspinning, the process makes sure power to motor 1010 is impeded (step 1212) and continues to monitor motor or downhole conditions via power cable 1012 or communications link 1014. When the processor determines the measured value is outside of the threshold range, motor 1010 is restarted in step 1214. As can be seen, these steps allow for both the detection of the backspin event and the determination of when the backspin event has ceased.

Figure 13:
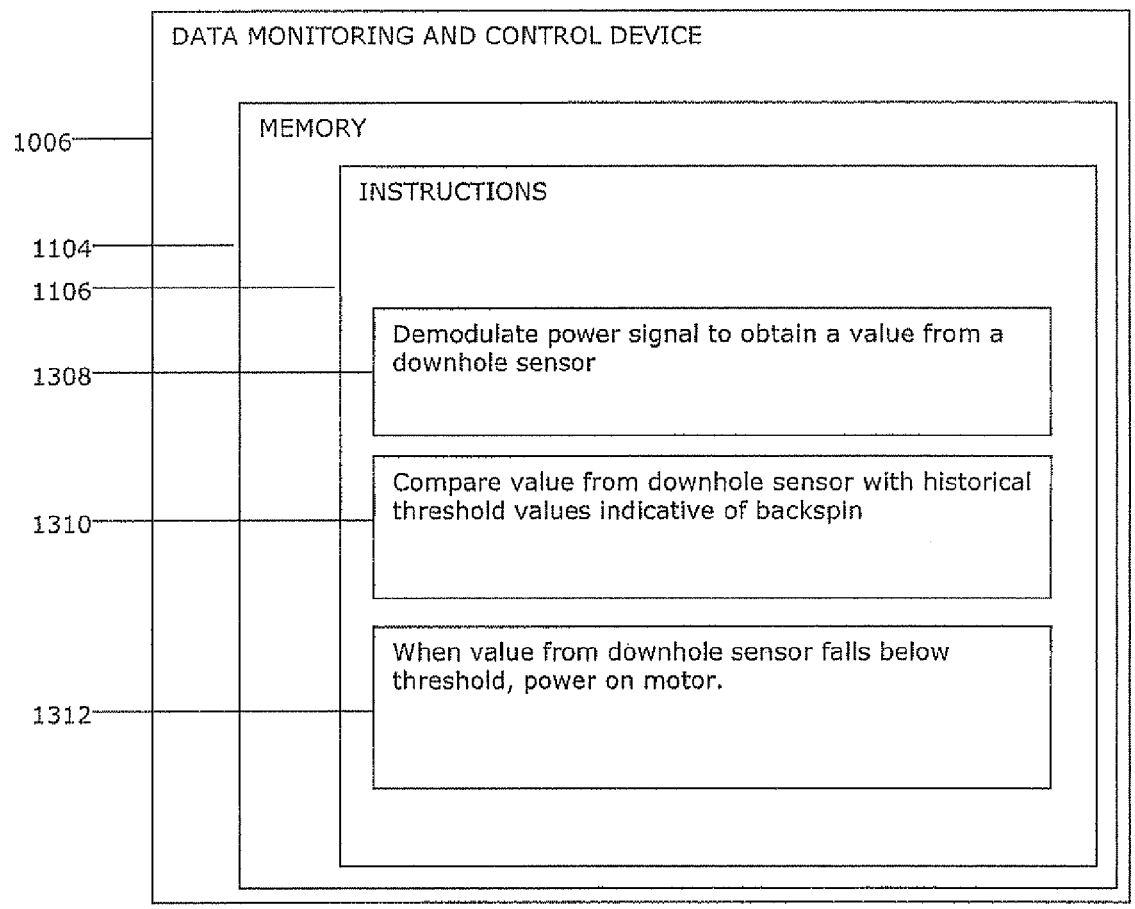
FIG. 13 is a schematic diagram of controller for detecting backspin according to an embodiment of the present invention.

A schematic of data monitoring and control device 1006 according to the above embodiment of the invention is shown with reference to FIG. 13. Data monitoring and control device 1006 includes a memory 1104 for storing program product 1106. Program product 1106 includes instruction 1308 to demodulate power signal received on power cable 1012 or process a signal received on communications link 1014 to obtain a measured value from sensor 1008; instruction 1310 to compare the measured value to historical threshold range for backspin events and to impede operable AC power to motor 1010 when a backspin is detected; and instruction 1312 to power back on motor 1010 when the measured value is outside of the threshold range indicating the backspin event is over.

In use, the backspin detection method and system according to this embodiment may be implemented with various sensors directly connected to data monitoring and control device 1006. As can be appreciated, a sensor directly connected to data monitoring and control device 1006 allows for a faster sampling rate with regard to sensed values and enables the system to monitor fluid properties in real time. As such, sensor 1008 could actually comprise two pressure sensors, i.e., strain gauges, piezos, or the like, at the ESP for sensing a difference in pressure between intake and discharge. Here, data monitoring a control device 1006 would be programmed to interpret the sensed signals as pressure signals. In such a system, the intake pressure signal would be monitored by data monitoring and control device 1006 to determine both when a backspin event occurred (by a change in the intake pressure), when the discharge pressure fell below a threshold value indicating the motor was no longer backspinning. Sensor 1008 could be also be an acoustic or light emitting device and collector at the wellhead that emits a downward acoustic/optical signal, and monitors the reflected signal for stasis at a particular threshold, i.e., when the signal becomes substantially constant, the acoustic/optical signal is reflecting from a substantially planar surface and fluid is no longer rising in the column. Here, data monitoring and control device 1006 would be programmed to interpret the reflected signals. In such a system, the reflected signal would be monitored and filtered to a particular frequency range by data monitoring and control device 1006. Once most of the filtered signal falls within the frequency range for e.g. a minute, data monitoring and control device 1006 would determine the motor had ceased backspinning.

Sensor 1008 could also be used in combination with the embodiments discussed above to determine when the motor starts backspinning. For example, if sensor 1008 is a pressure sensor, it could be placed near the top of the production tubing or near the wellhead to detect a vacuum that indicates the fluid is flowing downward. Similarly, if sensor 1008 is a temperature sensor, sensor 1008 could be placed near or in the wellhead for sensing temperature drop, i.e., a decrease in temperature indicates the fluid is flowing downward. If sensor 1008 is a flow meter, sensor 1008 is placed at the wellhead or at the pump to measure fluid flow up the tubing, including the direction of flow. Each of these sensors could be used in combination with the second embodiment where downhole sensors monitor the backspin event to determine when it stops, or the first embodiment, where data monitoring and control device 1006 directs an AC voltage through power cable 1012 to monitor input impedance on the power cable or reflective current on same to determine when the motor has stopped backspinning. These types of sensors could also be used in combination with prior art methods of determining when a motor has ceased backspinning, including monitoring residual voltage on power cable 1012 introduced by the backspinning motor.

In all of the described embodiments, once it is detected that a motor is backspinning, known techniques to stop the backspin, such as the injection of a DC voltage, can be employed. Such techniques can be used in conjunction with the sensing techniques described herein to further reduce the delay in restarting an ESP motor after the motor starts backspinning. It is also possible in all of the embodiments that the process of monitoring the condition of the motor begins when the motor is turned off manually or automatically by the control station. Since the devices and methods described above monitor the motor continuously, such manually shutting down the motor would not affect the operation of the embodiments of the invention described herein.

As one skilled in the art will appreciate, the functions of all components of the exemplary embodiments of the invention may execute within the same hardware as the other components comprising, or each component may operate in a separate hardware element. For example, the data processing, data acquisition/logging, and data control functions of the present invention can be achieved via separate components or all combined within the same component.

Although the present invention has been described in detail, it should be understood that various changes, substitutions, and alterations could be made hereupon without departing from the principle and scope of the invention. Accordingly, the scope of the present invention should be determined by the following claims and their appropriate legal equivalents. The singular forms "a", "an" and "the" include plural referents, unless the context clearly dictates otherwise. Optional or optionally means that the subsequently described event or circumstances may or may not occur. The description includes instances where the event or circumstance occurs and instances where it does not occur. Ranges may be expressed herein as from about one particular value, and/or to about another particular value. When such a range is expressed, it is to be understood that another embodiment is from the one particular value and/or to the other particular value, along with all combinations within said range. Throughout this application, where patents or publications are referenced, the disclosures of these references in their entireties are intended to be incorporated by reference into this application, in order to more fully describe the state of the art to which the invention pertains, except when these reference contradict the statements made herein.

What is claimed is:

1. An electrical submersible pump, comprising:
a motor and a pump adapted to be suspended in a wellbore;
a sensor for measuring non-electrical parameters in the wellbore, the sensor mounted downhole proximate to the motor, the sensor selected from the group consisting of:
   a vibration sensor placed on a shaft of the motor to determine whether the motor is backspinning, by measuring the frequency of vibrations in the shaft,
   a pressure sensor connected to the pump to determine whether the motor is backspinning by measuring the pressure across the pump,
   a rotational sensor connected to a shaft of motor to determine whether the motor is backspinning by measuring the speed and direction of the motor,
   an accelerometer connected to a shaft of the motor to determine whether the motor is backspinning measuring acceleration in the shaft,
   a strain gauge connected to a shaft of the motor to determine whether the motor is backspinning by measuring the torque of the shaft, and
   a flow meter connected to the pump to determine whether the motor is backspinning by measuring fluid flow across the pump;
a power cable connected between a motor and a controller, the power cable supplying a three phase AC current to the motor;
electronics connected to the sensor, the electronics receiving a signal from the sensor and transmitting the signal to a controller through the power cable or a communication line connecting the electronics to the controller;
a computer defining the controller, the controller having a non-transitory memory, a computer processor, and a computer program product stored on the memory and executable by the processor, the computer program product performing a process of controlling the variable speed drive of the motor and a process of monitoring the signal from the sensor to determine if the motor is backspinning, the computer program product comprising the instructions of:
monitoring the signal to determine whether the signal is above a threshold, the threshold for determining whether the signal is a noise signal or a backspin signal, and outputting the backspin signal;
impeding operable levels of power to the motor, responsive to the backspin signal;
monitoring the backspin signal to determine whether the backspin signal is below the threshold; and
returning power to the motor responsive to the determination that the backspin signal is below the threshold.

2. The electrical submersible pump of claim 1 wherein the signal is propagated to the controller via the power cable powering the motor.

3. The electrical submersible pump of claim 1, wherein the electronics receive power via the power cable used to deliver power to the motor.

4. The electrical submersible pump of claim 1, wherein the sensor receives power via the power cable used to deliver power to the motor.

5. The electrical submersible pump of claim 1, further comprising a variable speed driver that controls power to the motor via a power cable.

6. The electrical submersible pump of claim 5, wherein the variable speed driver is capable of regulating a voltage delivered to the motor according to inputs from the controller.

7. The electrical submersible pump of claim 6, wherein the variable speed driver sends a DC voltage through the power line to power the electronics when the motor is shut off.

8. A computer-implemented method comprising instructions that are operable on a computer defining the controller, the controller having, a non-transitory memory and a computer processor, the instructions being stored on the memory and executable by the processor, the computer implemented method performing a process of controlling the variable speed drive of a motor in a well or and a process determining if the motor is backspinning, the instructions, comprising the steps of:
monitoring a signal output from a sensor for measuring non-electrical parameters in a wellbore, the sensor positioned downhole proximate to the motor to determine whether the signal is above a threshold, the threshold for determining whether the signal is a noise signal or a backspin signal, and outputting the backspin signal, the sensor selected from the group consisting of:
   a vibration sensor placed on a shaft of the motor to determine whether the motor is backspinning by measuring the frequency of vibrations in the shaft,
   pressure sensor connected to the e pump to determine whether the motor is backspinning by measuring the pressure across the pump,
   a rotational sensor connected to a shaft of the motor to determine whether the motor is backspinning by measuring the speed and direction of the motor,
   an accelerometer connected to a shaft of the motor to determine whether the motor is backspinning by measuring acceleration in the shaft,
   a strain gauge connected to a shaft of the motor to determine whether the motor is backspinning by measuring the torque of the shaft, and
   a flow meter connected to the pump to determine whether the motor is backspinning by measuring fluid flow across the pump;
impeding operable levels of power to the motor, responsive to the backspin signal;
monitoring the backspin signal to determine whether the backspin signal is below the threshold; and
returning power to the motor responsive to the determination that the backspin signal is below the threshold.

9. The computer-implemented method of claim 8, further comprising the step of:
delivering a DC voltage downhole to stop the motor from backspinning once it is determined the motor is in backspin; and
delivering a three-phase AC current to the motor once the motor has stopped backspinning.

10. An electrical submersible pump for insertion in a well bore, comprising:
a motor and a pump;
a sensor for outputting a signal and positioned proximate motor, the sensor selected from the group consisting of:
   a vibration sensor placed on a shaft of the motor to determine whether the motor is backspinning by measuring the frequency of vibrations in the shaft,
   a pressure sensor connected to the pump to determine whether the motor is backspinning by measuring the pressure across the pump, a rotational sensor connected to a shaft of the motor to determine whether the motor is backspinning by measuring the speed and direction of the motor, an accelerometer connected to a shaft of the motor to determine whether the motor is backspinning by measuring acceleration in the shaft, a strain gauge connected to a shaft of the motor to determine whether the motor is backspinning by measuring the torque of the shaft, and a flow meter connected to the pump to determine whether the motor is backspinning by measuring fluid flow across the pump; and a controller that receives the signal from the sensor to determine whether the motor is backspinning, the controller configured to impede power to the motor if the motor is backspinning.

* * * * *

UNITED STATES PATENT AND TRADEMARK OFFICE
CERTIFICATE OF CORRECTION

PATENT NO.         : 8,400,093 B2                                        Page 1 of 1
APPLICATION NO.    : 12/869368
DATED              : March 19, 2013
INVENTOR(S)        : Dick L. Knox et al.

It is certified that error appears in the above-identified patent and that said Letters Patent is hereby corrected as shown below:

In the Claims:

Claim 8, Column 16, line 13, after "motor" insert -- of a pump --
Claim 8, Column 16, line 27, delete "the e" and insert -- the --

Signed and Sealed this
Seventeenth Day of September, 2013

Teresa Stanek Rea
*Deputy Director of theUnited States Patent and Trademark Office*